United States Patent [19]

Gerber et al.

[11] Patent Number: 5,730,880
[45] Date of Patent: Mar. 24, 1998

[54] PROCESS FOR REMOVING UNWANTED MATERIAL FROM WANTED MATERIAL

[75] Inventors: Dirk Gerber, Grimbergen; Peter Michel Gerber, Peutie; Viviane Gertrude Johanna Neyens, Scherpenheuvel; Peter Frans Eugeen Maria Stroobants, Ham, all of Belgium

[73] Assignee: Imperial Chemical Industries PLC, London, England

[21] Appl. No.: 673,607

[22] Filed: Jun. 25, 1996

[30] Foreign Application Priority Data

Jun. 27, 1995 [EP] European Pat. Off. ............ 95201746

[51] Int. Cl.$^6$ .................................................. C02F 1/28
[52] U.S. Cl. ........................ 210/693; 210/732; 210/924
[58] Field of Search ..................................... 210/692, 693, 210/922, 924, 925, 732

[56] References Cited

U.S. PATENT DOCUMENTS

| | | | |
|---|---|---|---|
| 3,869,385 | 3/1975 | Stanley et al. | 210/53 |
| 4,980,072 | 12/1990 | Augustin et al. | 521/53 |
| 5,504,124 | 4/1996 | Cassidy et al. | 521/53 |

FOREIGN PATENT DOCUMENTS

| | | |
|---|---|---|
| 2057425 | 6/1992 | Canada . |
| 0370349 | 5/1990 | European Pat. Off. . |
| 415127 | 3/1991 | European Pat. Off. . |
| 547765 | 6/1993 | European Pat. Off. . |
| 1944679 | 3/1971 | Germany . |
| 3315596 | 10/1984 | Germany . |
| 05329951 | 6/1992 | Japan . |
| 1170959 | 11/1969 | United Kingdom . |
| 9531402 | 11/1995 | WIPO . |

*Primary Examiner*—Neil McCarthy

[57] ABSTRACT

Process for removing unwanted material from wanted material containing water by bringing an isocyanate-containing prepolymer into contact with the materials, allowing the prepolymer to react with the water to form a flexible foam and removing the foam obtained from the wanted material.

12 Claims, No Drawings

PROCESS FOR REMOVING UNWANTED MATERIAL FROM WANTED MATERIAL

The present invention is concerned with a process for removing unwanted material from wanted material using a certain Polymer.

In GB170959 and U.S. Pat. No. 3,869,385 it has been described to spray formulations suitable for making polyurethane foam on water or sand in order to remove oil.

DE3315596 discloses the use of polyurethane prepolymers, made from polyether polyols comprising 70–95% by weight of ethylene oxide units and polyisocyanates, as floculating agents in order to clean water comprising industrial waste. The floculated waste precipitates and would therefore be difficult to recover. Two prepolymers, having an NCO value of 7% by weight and which were made from a polyol comprising EO and PO units in a weight ratio of 75/25 and having a nominal functionality of 3 and a molecular weight of 4000, have been used; the one prepolymer having been made from toluene diisocyanate and the other from a 50/50 w/w mixture of 2,4'- and 4,4'-diphenylmethane diisocyanate. The amounts of prepolymer used are small.

EP-415127 also discloses the use of prepolymers as floculating agents.

EP-370349 discloses the use of an isocyanate terminated prepolymer for removing hydrocarbons, in particular oil, by preparing a gel. Removal of the gel would be cumbersome since its strength is relatively weak. EP-370349 discloses the use of a prepolymer having an NCO value of 4.2% by weight which has been made from toluene diisocyanate and a polyether polyol which has been tipped with about 2% by weight of propylene oxide. Further it is disclosed that the prepolymer may be mixed with water before the prepolymer is brought into contact with the oil. In the examples the prepolymer is combined with water and thoroughly mixed for 25 seconds before it is combined with the oil. It is believed that this premixing with water is conducted in order to achieve a certain degree of prereaction of the prepolymer and the water; without such a long mixing time, which under field conditions would be unpractically long, only crumbs would be obtained which crumbs would not be recoverable.

Co-pending application PCT/EP95/01517 discloses the use of a prepolymer, made from 4,4'-MDI and a polyol having an oxyethylene content of 50–85% by weight, for removing oil-spills from water. Further it is disclosed that the prepolymer may be brought into contact with the oil/water as a froth which is obtained by adding water to the prepolymer. Surprisingly we have found that the process for removing oil from water by using such a prepolymer may be further improved by adding a certain amount of water to this prepolymer a few instants before the prepolymer is brought into contact with the oil/water. The use of the water reduces the viscosity of the prepolymer and changes th surface tension to such an extent that it is easier to apply the prepolymer to the oil/water:adequate spraying patterns (fine droplets) are obtained, especially when a spraying gun is used wherein the prepolymer and the water are mixed, and a sufficiently high output of the prepolymer from such a spraying gun can be obtained; without this water the output is low and the prepolymer leaves the nozzle of the gun as a jet-stream. Further it showed that the flexible foam, which is obtained after the prepolymer/water mixture has been combined with the oil/water and which contains the oil, is able to retain the oil very well after the foam has been removed from the water surface. Since the water is added to the prepolymer only a few instants before the prepolymer is brought into contact with the oil/water no noticeable prereaction takes place, in particular not when the water is applied at a temperature of 5°–35° C.

Consequently the present invention is concerned with a process for removing unwanted material from wanted material in the presence of water by bringing an isocyanate-containing prepolymer into contact with the materials, allowing the prepolymer to react with at least part of the water to form a flexible foam and removing the foam obtained from the wanted material, the prepolymer having an NCO value of 2–10% by weight and preferably 5–10% by weight and being the reaction product obtained by reacting an excessive amount of a polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the amount of prepolymer used being 5 to 200 parts by weight per 100 parts by weight of unwanted material, characterised in that the prepolymer is combined with 2–100 and preferably 5–50 parts by weight of water per part by weight of prepolymer at most 20 seconds, preferably at most 10 seconds and most preferably at most 5 seconds before it is brought into contact with the materials. This combination of 2–100 parts of water and 1 part of the prepolymer may be conducted by methods known in the art. The prepolymer may be added to the water or the water may be added to the prepolymer, optionally followed by mixing, before the prepolymer is brought into contact with the materials. Advantageously a device may be used which is able to apply a spray of liquid droplets onto a surface, like a spray gun, which device is connected to a water supply and a prepolymer supply, which supplies are combined to one supply before the nozzle of the device.

Surprisingly it was found that large amounts of water kept at ambient temperature (5°–35° C.) would delay reaction with the prepolymer for a sufficiently long period that it would allow for the use of water as a viscosity reducer of the polyisocyanate prepolymer.

Further the present invention is concerned with the use of water as a viscosity reducer for a prepolymer having an NCO value of 2–10% by weight and being the reaction product obtained by reacting an excessive amount of polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the water being used in an amount of 2 to 100 parts by weight per part by weight of prepolymer.

Although other materials than water may be used together with the prepolymer, it is preferred to use the prepolymer without additional material in the process according to the present invention.

Unwanted material in the context of the present application is a material which is in contact with another material—the wanted material—and which is regarded as a pollutant of the wanted material and which therefore is to be removed or separated from said wanted material.

Wanted material is the material from which the unwanted material is to be removed or separated.

Combinations of unwanted/wanted material are for instance oil/water, paint/water, ink/water, oil/sand (beach), oil/rocks, other petroleun products/water and industrial waste/water.

In particular the process is useful for removing oil or other water insoluble hydrocarbons from water.

The amount of prepolymer used may range from 5 to 200, preferably from 10 to 100, most preferably from 20 to 80 parts by weight per 100 parts by weight of unwanted material. In practice the amount of unwanted material may be estimated. If the amount was estimated too low the process may be repeated and if the amount was estimated too high some additional foam is formed.

The prepolymer/water mixture may be brought into contact with the materials in any known way, e.g. spraying, pouring and whipping. If desired, the prepolymer may be mixed with the materials. The prepolymer is allowed to react preferably under ambient conditions. The process can even be applied at low ambient temperature, as long as sufficient—liquid—water is present. The prepolymer reacts with part of the water to form a flexible foam. In general the reaction is complete in 1 to 15 minutes. The foam obtained contains unwanted material: it is included, absorbed and/or adsorbed. The flexible foam then is removed from the wanted material in any known way. It may be taken or pulled from the wanted material and subsequently dried and cut into smaller pieces and/or compressed. The collected foam, preferably after drying, may be used for energy recovery.

The polyisocyanate used in making the prepolymer may be selected from polymethylene polyphenylene polyisocyanates comprising at least 25, preferably at least 50 and most preferably at least 85% by weight of 4,4'-diphenylmethane diisocyanate (4,4'-MDI) or a liquid variant thereof. Preferably the polyisocyanate has an isocyanate functionality of 2.0 to 3, more preferably of 2.0 to 2.3, most preferably of 2.0 to 2.1.

In the context of the present invention the term polymethylene polyphenylene polyisocyanates includes diphenylmethane diisocyanates and oligomers thereof, known in the art as crude or polymeric MDI, having an isocyanate functionality of greater than 2.

The polyisocyanate may consist essentially of pure 4,4'-diphenylmethane diisocyanate or mixtures of this diisocyanate with other diphenylmethane diisocyanate isomers, for example the 2,2' isomer optionally in conjunction with the 2,2'-isomer. The polyisocyanate may also be an MDI variant derived from such a polyisocyanate containing at least 25%, preferably at least 50% and most preferably at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanates, such a carbodiimide and/or uretonimine modified polyisocyanate preferably having an NCO value of at least 25% by weight, and/or by reacting such a polyisocyanate with one or more polyols having a hydroxyl functionality of 2–6 and a molecular weight of 62–1000 so as to obtain a modified polyisocyanate, preferably having an NCO value of at least 25% by weight. The polyisocyanate may comprise minor amounts of polymethylene polyphenylene polyisocyanates having an isocyanate functionality of greater than 2; this amount preferably is such that the isocyanate functionality of the total polyisocyanate is 2.0 to 2.5, more preferably 2.0 to 2.3, most preferably 2.0 to 2.1.

The polyol used in preparing the prepolymer preferably has an average nominal hydroxyl functionality of 2–4 and most preferably of 2.5–3.5, a number average hydroxyl equivalent weight of 1000–3000 and an oxyethylene content of from 50 to 85% by weight. The polyether polyols used in preparing the prepolymer include products obtained by the polymerisation of ethylene oxide optionally together with another cyclic oxide like tetrahydrofuran, butylene oxide and—preferably—propylene oxide in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol and pentaerythritol. Mixtures of initiators may be used.

The polyol may be obtained by the simultaneous or sequential addition of ethylene oxide and the other cyclic oxide to the initiator. The sequential addition may be conducted in any order. Sequential addition will give polyols of the so called block copolymer type. Simultaneous addition will give polyols of the so called random type. Most preferred are random polyoxyethylene polyoxypropylene polyols having an oxyethylene content of 50 to 85% by weight.

In order to obtain the most preferred polyol having an average nominal hydroxyl functionality of 2.5 to 3.5 a polyol having a nominal hydroxyl functionality of 3 may be used or a mixture of polyols, which each may have another average nominal hydroxyl functionality provided the mixture is in the above 2.5–3.5 functionality range.

The term "average nominal hydroxyl functionality" is used herein to indicate the average functionality (number of hydroxyl groups per molecule) of the polyol on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation. The term "average" refers to number average in the present specification.

The prepolymer is prepared conventionally by reacting the polyisocyanate and the polyol at relative amounts so as to obtain an NCO value of 2–10% and preferably 5–10% by weight at a temperature preferably between 40° and 100° C. The prepolymers so prepared are liquid at ambient conditions. The polyisocyanates, polyols, prepolymers and ways to prepare them are known as such; see e.g. EP-547765.

The present invention is illustrated by the following examples.

EXAMPLE 1

A prepolymer was prepared by reacting 30 parts by weight of 4,4'-MDI and 70 parts by weight (pbw) of an EO/PO polyol having a molecular weight of 4000, a nominal functionality of 3 and EO content of 75% by weight (random). The NCO-value of the prepolymer was 7.8% by weight (prepolymer 1).

A 1 l. plastic cup was filled with 120 ml water followed by 40 g of used motor oil. To this cup 400 g of water and 20 g of prepolymer 1 were added after having been mixed for 5 seconds. Then the content of the flask was mixed thoroughly and allowed to react. After 5 minutes a coherent flexible foam was removed from the water surface which foam contained all the oil. The foam retained the oil for more than 1 day after it had been removed from the water surface.

COMPARATIVE EXAMPLE 2

A container having a diameter of 170 cm was filled with water (height of the water level was 40 cm from the bottom of the container). 1 l of old motor oil was poured on the water and allowed to spread on the surface. Then 300 g of prepolymer 1 was added via a spray gun with an air tipped nozzle. The gun had a length of 12 cm and a diameter of 7 mm; the nozzle was kept at a distance of 1 meter from the oil surface. The maximal achievable output of the prepolymer was 150 g per minute (gun pressure applied 8 bar abs). The prepolymer left the nozzle as a jet. The prepolymer was allowed to react for 10 minutes. Part of the prepolymer sank to the bottom of the container and formed crumbs on foaming. Part of the flexible foam could be removed from the surface; this foam contained less than $\frac{2}{3}$ of the oil.

EXAMPLE 3

Example 2 was repeated with the proviso that water and prepolymer 1 were combined in a weight ratio of 20:1 at the beginning of the gun (and hence 12 cm from the nozzle). The prepolymer/water mixture left the nozzle as a spray of fine droplets. The output was 21 liter per minute. Spraying was conducted for about 30 seconds at 6 bar abs. The time between the combination of the prepolymer and the water and the contact of this combination with the oil/water can be calculated to be about 0.1 second. A coherent flexible foam was removed containing all the oil. No crumbs were noticeable at the bottom. The foam was able to retain all the oil for more than 1 day.

EXAMPLE 4

Example 3 was repeated with the proviso that the spray gun had a simple nozzle (no air tipping). The result was the same.

we claim:

1. Process for removing unwanted material from wanted material in the presence of water by bringing an isocyanate-containing prepolymer into contact with the materials, allowing the prepolymer to react with at least part of the water to form a flexible foam and removing the foam obtained from the wanted material, the prepolymer having an NCO value of 2–10% by weight and being the reaction product obtained by reacting an excessive amount of poly/methylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the amount of prepolymer used being 5 to 200 parts by weight per 100 parts by weight of unwanted material characterised in that the prepolymer is combined with 2–100 parts by weight of the water per part by weight of prepolymer at most 20 seconds before it is brought into contact with the materials.

2. Process according to claim 1 wherein the amount of prepolymer is 10 to 100 parts by weight per 100 parts by weight of unwanted material.

3. Process according to claim 1 wherein the polyisocyanate comprises at least 85% by weight of 4,4'-diphenylmethane diisocyanate or a liquid variant thereof.

4. Process according to claim 1 wherein the polyol has an oxyethylene content of 50 to 85% by weight.

5. Process according to claim 1 wherein the polyol is a random polyoxyethylene polyoxypropylene polyol.

6. Process according to claim 1 wherein the water is brought into contact with the prepolymer at most 5 seconds before the prepolymer is brought into contact with the materials in an amount of 5–50 parts of water per part of prepolymer.

7. Process according to claim 1 wherein the NCO value of the prepolymer is 5–10% by weight.

8. The use of water as a viscosity reducer for a prepolymer having an NCO value of 2–10% by weight and being the reaction product obtained by reacting an excessive amount of polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the water being used in an amount of 2 to 100 parts by weight per part by weight of prepolymer.

9. The use as in claim 8 wherein the polyisocyanate comprises at least 85% by weight of 4,4'-diphenylmethane diisocyanate or a liquid variant thereof.

10. The use as in claim 8 wherein the polyol has an oxyethylene content of 50 to 85% by weight.

11. The use as in claim 8 wherein the polyol is a random polyoxyethylene polyoxypropylene polyol.

12. The use as in claim 8 wherein the NCO value of the prepolymer is 5–10% by weight.

* * * * *